United States Patent [19]

Sherman

[11] Patent Number: 5,531,287
[45] Date of Patent: Jul. 2, 1996

[54] POWER STEERING SYSTEM WITH VIBRATION AND NOISE SUPPRESSION

[75] Inventor: Howard M. Sherman, Clarkston, Mich.

[73] Assignee: Chrysler Corporation, Auburn Hills, Mich.

[21] Appl. No.: 411,025

[22] Filed: Mar. 27, 1995

[51] Int. Cl.[6] .................................................. B62D 5/06
[52] U.S. Cl. ............................ 180/417; 138/44; 180/428
[58] Field of Search ....................................... 180/132, 141, 180/142, 143; 138/37, 40, 44

[56] References Cited

U.S. PATENT DOCUMENTS

| | | |
|---|---|---|
| 4,438,827 | 3/1984 | Lang ........................................ 180/143 |
| 4,796,715 | 1/1989 | Futaba et al. ........................... 180/143 |
| 5,184,693 | 2/1993 | Miller ...................................... 180/143 |
| 5,330,024 | 7/1994 | Emori et al. ......................... 180/132 X |

*Primary Examiner*—Kevin T. Hurley
*Attorney, Agent, or Firm*—Edward A. Craig

[57] ABSTRACT

A power steering system has a power assist for the steering gear of an automotive vehicle. The power assist comprises a piston reciprocable in a cylinder. Hydraulic fluid is delivered to opposite sides of the piston by a control valve. A pressure line delivers hydraulic fluid to the control valve from a pump. A return line returns hydraulic fluid to a pump reservoir. An anti-rattle device provides a restriction in the return line to suppress the transmission of noise and vibrations from the road travelled through the steering gear to the steering wheel.

8 Claims, 1 Drawing Sheet

5,531,287

POWER STEERING SYSTEM WITH VIBRATION AND NOISE SUPPRESSION

FIELD OF THE INVENTION

This invention relates generally to power steering systems for automotive vehicles and more particularly to a power steering system having provision for suppressing the transmission of noise and vibrations to the steering wheel.

BACKGROUND AND SUMMARY OF THE INVENTION

A conventional power steering system normally includes a power steering pump, power steering gear, power steering reservoir, supply hose, pressure hose, and return line. Turning of the steering wheel is converted into linear travel by the steering gear through the meshing of the helical teeth of a pinion with the teeth of a rack. Power assist is provided by a rotary type control valve which directs oil from the power steering pump to either side of a piston carried by the rack.

Road feel is controlled by the diameter of a torsion bar which initially steers the vehicle. As steering effort increases, as in a turn, the torsion bar twists, causing relative rotary motion between the rotary valve body and valve spool of the control valve. This movement directs oil behind the rack piston, which in turn builds up hydraulic pressure and assists in the turning effort.

Hydraulic pressure is delivered to the control valve and the power steering gear preferably by a vane type pump. The power steering pump is connected to the control valve by a pressure hose and a return hose.

During certain driving maneuvers, and dependent on particular vehicle suspension designs, various road inputs, such as pot holes and the like, can be transmitted from the road wheels through the steering gear and steering column to the steering wheel. The driver feels vibrations and may hear a knock-like noise. This phenomenon, commonly known as "rack rattle", may be more pronounced at different speeds or different maneuvers.

There is a need for something to dampen these road inputs. In accordance with this invention, a flow restriction device is provided in the return line. Restricting the return flow of fluid has been found to be highly effective in suppressing the transmission of road inputs through the steering gear back to the steering wheel.

In accordance with the preferred embodiment disclosed herein, the restriction device comprises a tubular formation having a cylindrical wall provided with a nose portion at the downstream end which tapers radially inwardly in the direction of return flow of fluid and terminates in an outlet orifice of reduced internal cross-section. Preferably, the return line comprises a relatively rigid tube extending from the control valve having the tubular formation integrally formed on its end, and a flexible tube extending from the reservoir and forced over the tubular formation in the manner of a sleeve. Preferably, the tubular formation has spaced apart enlargements and a band encircles the flexible tube between the enlargements to retain the flexible tube sleeved on the rigid tube.

An object of this invention is to provide a means for suppressing rack-rattle in a power steering system having the foregoing characteristics and capabilities.

Another object is to provide a restriction device for suppressing rack rattle which is of simple and rugged construction, and capable of being readily and easily installed.

These and other objects, features and advantages of the invention will become more apparent as the following description proceeds, especially when considered with the accompanying claims and drawings.

DETAILED DESCRIPTION OF THE PREFERRED EMBODIMENT

Figures 1, 2:
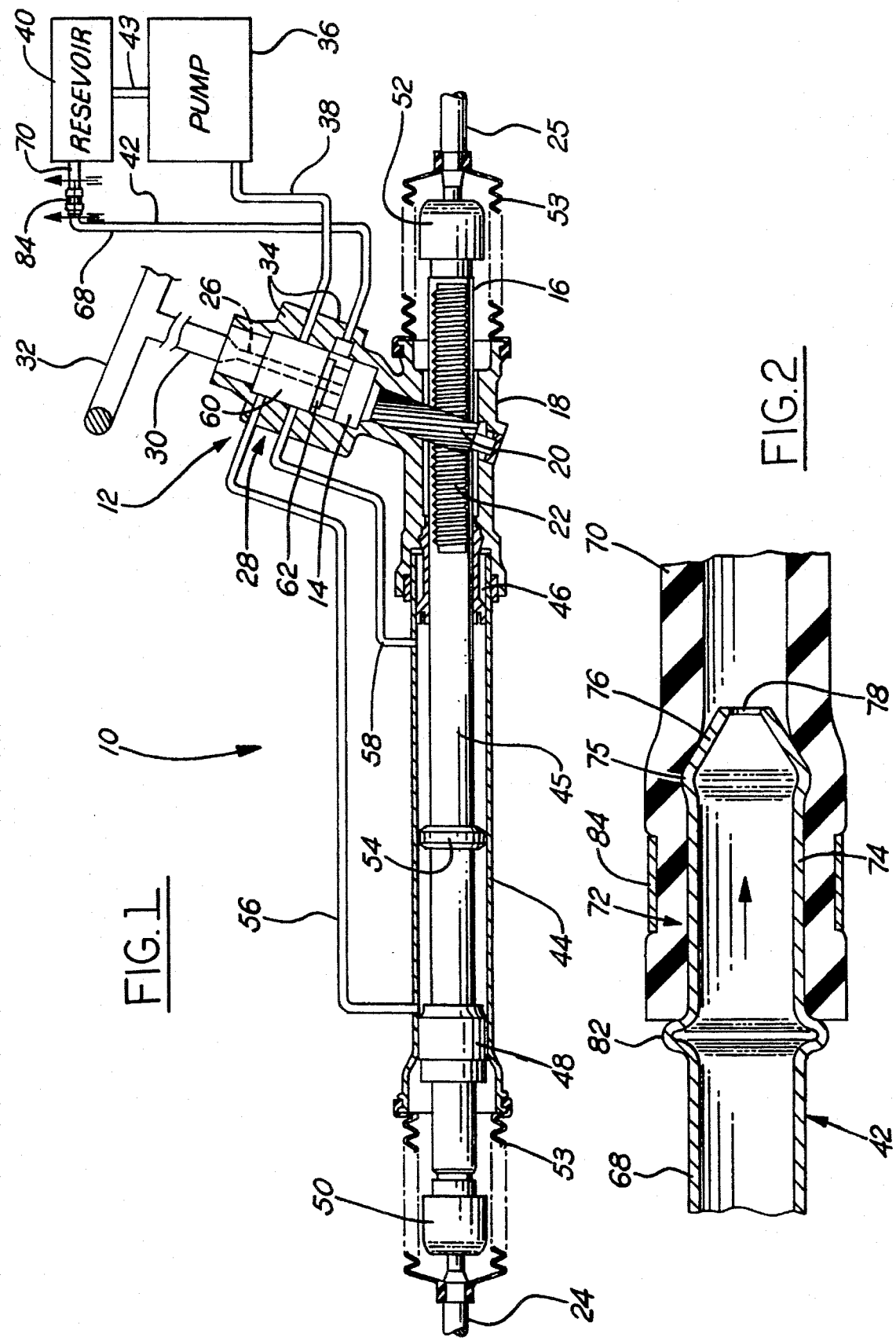
FIG. 1 is a semi-diagrammatic view with parts broken away and in section of a power steering system embodying the invention.
FIG. 2 is an enlarged sectional view taken on the line 2—2 in FIG. 1.

Referring now more particularly to the drawings, the power steering system 10 comprises a steering gear assembly 12 including a pinion 14 and an elongated rack 16 adapted to extend transversely of the vehicle in which the power steering system is installed. The pinion 14 is rotatably supported in a casing 18 and rack 16 is longitudinally reciprocable in casing 18. The pinion 14 has helical teeth 20 meshing with teeth 22 on the rack. Rotation of the pinion 14 causes longitudinal movement of the rack 16 in one direction or the other depending on the direction of pinion rotation. The ends of the rack 16 are operatively connected to tie rods 24 and 25 which are operatively connected to the front wheels (not shown) of the vehicle.

The pinion 14 is connected to the lower end of a torsion bar 26 which is part of an open center, rotary type control valve 28. The upper end of the torsion bar 26 is connected to the lower end of a shaft 30. A steering wheel 32 is mounted on the upper end of shaft 30 so that rotation of the steering wheel 32 rotates the torsion bar 26 and the pinion 14.

The control valve 28 comprises a housing 34 which is part of the casing 18. A power steering pump 36, which may be a belt driven, constant displacement, vane type pump, delivers hydraulic fluid to the control valve 28 through a pressure hose or line 38. Hydraulic fluid from the control valve 28 returns to reservoir 40 through a return hose or line 42, and from reservoir 40 through hose 43 to the pump 36.

An extension 45 of the rack 16 reciprocates in an elongated cylinder 44. One end of cylinder 44 is joined to the casing 18 and sealed by the sealing sleeve 46 which is slidably engaged by the rack 16. The other end of the cylinder 44 is sealed and closed by a head 48 through which the extension 45 of the rack 16 slidably extends. The ends of the rack are outside the cylinder and are connected to the tie rods 24 and 25 by ball joints 50 and 52. Tubular extensible covers 53 protect the joints 50,52 and the portions of the rack outside the cylinder 44. A piston 54 is formed on the extension 45 of rack 16 within the cylinder 44.

A fluid line 56 extends from the control valve 28 to cylinder 44 near the head 48 at one side of the piston 54. A fluid line 58 extends from the control valve 28 to cylinder 44 near the sleeve 46 at the opposite side of the piston.

In addition to the torsion bar 26, the control valve 28 also has a rotary valve body or sleeve 60 and valve spool 62. The control valve 28 is of conventional design and a detailed description of its construction is not needed. However, it should be understood that the torsion bar 26 which initially steers the vehicle twists slightly when rotated, due to resistance of the pinion 14. This twisting causes rotation of the valve body 60 (connected to the pinion) relative to the valve spool 62 (connected to the top of the torsion bar). Such relative rotation of the valve body 60 and spool 62 directs hydraulic fluid from the control valve 28 through one of the lines 56,58 to one side of the piston 54 in cylinder 44, while hydraulic fluid at the other side of the piston is returned through the other of lines 56,58 through the control valve and return line 42 to reservoir 40. This arrangement provides a power assist while turning the vehicle.

The return line 42 consists of a relatively rigid tube 68 formed of any suitable material, preferably metal, extending from the control valve 28, and a flexible tube 70 formed of any suitable material, such as rubber, extending from the reservoir 40. A restriction device 72 is integrally formed on the end of the tube 68, of one piece therewith. The restriction device 72 has a tubular cylindrical side wall 74 aligned with the direction of return flow and of the same uniform circular cross-section throughout its length. The rest of the tube 68 is of the same cross-section as the side wall 74. The downstream end of the restriction device has a frusto-conical nose 76 which is concentric with side wall 74. At the point where the nose 76 joins the side wall 74, the nose is expanded somewhat to provide a circular enlargement 75 of arcuate form as seen in FIG. 2 and of larger inside and outside diameter than the side wall 74. From the enlargement, the nose tapers radially inwardly in a downstream direction to form a circular outlet orifice 78 of reduced cross-section relative to the inside of the side wall 74. The orifice 78 is on the centerline of the passage through the tube 68 and side wall 74. The nose 76 provides a gradual rather than an abrupt restriction to flow. Spaced from the nose 76 and at the opposite end of side wall 74, the tube 68 is formed with a circular enlargement 82 of arcuate form as seen in FIG. 2 and of increased inside and outside diameter relative to side wall 74.

The flexible tube 70 is sleeved over the restriction device 72, being stretched over enlargement 75 to prevent leakage. The end of tube 70 abuts the enlargement 82. A flexible band 84 encircles the flexible tube 70 between the enlargements 75 and 82 to retain the flexible tube sleeved on the restriction device 72.

Preferably the nose taper forms an included angle of 62°. The diameter of the orifice is about ⅛ inch and preferably 0.106 inches. The side wall 74 is preferably about 5/16 inches in inside diameter.

The restriction device 72 increases back pressure and places a restraint on the return flow of hydraulic fluid in the return line 42. It has been found that by placing this restriction in the return line, the transmission through the steering gear to the steering wheel of noise and vibrations incident to road travel is dampened or suppressed if not entirely eliminated. The restriction device is preferably located a substantial distance from the control valve 28 so as not to affect its operation.

What is claimed is:

1. A power steering system comprising steering gear having a pinion adapted to be rotated by the steering wheel of an automotive vehicle, a rack meshing with said pinion whereby the rotation of said pinion is converted to linear travel of said rack, a power assist for said rack comprising a hydraulic cylinder, a piston reciprocable in said cylinder operatively connected to said rack, first and second fluid lines communicating with said cylinder at opposite sides respectively of said piston, a control valve for directing hydraulic fluid to said cylinder selectively through said first and second fluid lines, a source of hydraulic fluid under pressure, a pressure line from said source of hydraulic fluid to said control valve to deliver fluid under pressure to said control valve, and a return line from said control valve to said source of hydraulic fluid for the return flow of hydraulic fluid to said source, characterized in the provision of anti-rattle means for suppressing the transmission through the steering gear to the steering wheel of vibrations and noise due to irregularities in the road travelled by the vehicle, said anti-rate means comprising a restriction structure having an orifice of reduced area relative to the cross-sectional area of the return line, said restriction comprising a tubular formation in said return line, said tubular formation having a cylindrical wall formed with a portion tapering radially inwardly in the direction of return flow to said source of hydraulic fluid and forming the orifice of reduced internal cross-section relative to said cylindrical wall.

2. A power steering system comprising steering gear having a pinion adapted to be rotated by the steering wheel of an automotive vehicle, a rack meshing with said pinion whereby the rotation of said pinion is converted to linear travel of said rack, a power assist for said rack comprising a hydraulic cylinder, a piston reciprocable in said cylinder operatively connected to said rack, first and second fluid lines communicating with said cylinder at opposite sides respectively of said piston, a control valve for directing hydraulic fluid to said cylinder selectively through said first and second fluid lines, a source of hydraulic fluid under pressure, a pressure line from said source of hydraulic fluid to said control valve to deliver fluid under pressure to said control valve, and a return line from said control valve to said source of hydraulic fluid for the return flow of hydraulic fluid to said source, characterized in the provision of anti-rattle means for suppressing the transmission through the steering gear to the steering wheel of vibrations and noise due to irregularities in the road travelled by the vehicle, said anti-rate means comprising a restriction structure having an orifice of reduced area relative to the cross-sectional area of the return line, said restriction comprising a tubular formation in said return line, said tubular formation having a cylindrical wall aligned with the direction of return flow of hydraulic fluid to said source, said side wall having a downstream end provided with a nose end portion which tapers radially inwardly in the direction of return flow to said source of hydraulic fluid and terminates in an outlet orifice of reduced internal cross-section relative to said cylindrical wall.

3. A power steering system as in claim 2 wherein said orifice has a diameter of about ⅛ inch.

4. A power steering system as in claim 2, wherein the taper of said nose end portion forms an included angle of about 62°.

5. A power steering system as in claim 2, wherein said return line comprises a relatively rigid tube extending from said control valve and a relatively flexible tube extending from said source of hydraulic fluid, said rigid tube having a first end and said flexible tube having a second end, said tubular formation being integrally formed on said first end of said rigid tube, and said second end of said flexible tube being sleeved over said tubular formation.

6. A power steering system as in claim 5, wherein said nose end portion has a maximum diameter greater than the diameter of said cylindrical wall, forming at the point of maximum diameter an annular enlargement over which said flexible tube is stretched to resist leakage.

7. A power steering system as in claim 6, wherein said cylindrical wall of said tubular formation has a second annular enlargement spaced from said nose end portion, said second enlargement serving as an abutment engageable by the second end of said flexible tube, and a band encircling said second end of said flexible tube between said enlargements to retain said flexible tube sleeved in said tubular formation.

8. A power steering system as in claim 7, wherein said orifice has a diameter of about 0.106 inches and the taper of said nose end portion forms an included angle of about 62°.

* * * * *